United States Patent [19]

Patsiokas et al.

[11] Patent Number: 5,218,630
[45] Date of Patent: Jun. 8, 1993

[54] METHOD FOR CHANNEL UTILIZATION IN EXTENDED SPECTRUM COMMUNICATION SYSTEMS

[75] Inventors: Stelios J. Patsiokas, Plantation; Craig P. Wadin, Sunrise; Paul D. Marko, Ft. Lauderdale, all of Fla.

[73] Assignee: Motorola, Inc., Schaumburg, Ill.

[21] Appl. No.: 879,436

[22] Filed: May 6, 1992

[51] Int. Cl.⁵ ............................................ H04M 11/00
[52] U.S. Cl. ......................................... 379/59; 379/61; 455/34.1
[58] Field of Search ........................... 379/58, 59, 61; 455/34.1, 54.2

[56] References Cited

U.S. PATENT DOCUMENTS

| | | | |
|---|---|---|---|
| 4,980,907 | 12/1990 | Raith et al. | 379/61 |
| 5,109,527 | 4/1992 | Akerberg | 455/34.1 |
| 5,109,529 | 4/1992 | Akaiwa | 455/34.1 |
| 5,119,397 | 6/1992 | Dahlin et al. | 379/59 |
| 5,148,548 | 9/1992 | Meche et al. | 379/59 |

Primary Examiner—Curtis Kuntz
Assistant Examiner—Vijay Shankar
Attorney, Agent, or Firm—Pablo Meles; Thomas G. Berry

[57] ABSTRACT

A base station allocates radio channels to radio telephone handsets in a second generation cordless telephone (CT2) communication systems by scanning each channel in a first band, and scanning each channel in a second band to measure an RSS level for each channel scanned. The base station scans the second band at a rate that is substantially faster than the rate at which it scans the first band. If a link request is received on a first channel within the first band, from a calling radio telephone, the base station determines whether the first channel has an RSS level above a predetermined threshold. If the RSS level of the first channel is above the threshold, and the calling radio telephone handset is capable of operating on the second band, the base station re-assigns a second channel, that is within the second band, to the calling radio telephone handset.

4 Claims, 3 Drawing Sheets

METHOD FOR CHANNEL UTILIZATION IN EXTENDED SPECTRUM COMMUNICATION SYSTEMS

TECHNICAL FIELD

This invention relates generally to communications electronics equipment, and more specifically, to second generation cordless telephones (CT2).

BACKGROUND

Present CT2 (or telepoint) systems in accordance with the CT2 Common Air Interface (the regulations governing the CT2 communication systems) have been allocated 4 MHz (864.1–868.1) of spectrum, which provides 40 communications channels spaced at 100 kHz intervals. This common band has been allocated across Europe and in several territories in the far east. However, due to capacity limitations in the CT2 Common Air Interface several jurisdictions may increase the portion of the spectrum allocated to CT2 by an additional band or two additional bands at each side of the present CT2 band.

The CT2 CAI specifications were specifically designed for 40 channels and much of the system timing is determined by this fact. For instance, a calling handset initiating a link request will transmit in accordance with a multiplex protocol known as MUX3 on a selected free channel for a minimum of 750 mSec. This allows a base scanning 40 channels for incoming link requests 750 mSec, to find and respond to the calling handset. In order to identify a link request, the base must first detect a channel marker in the link request signal. The channel marker is a code transmitted every 14 mSec. in the MUX3 protocol. To allow for synthesizer channel lock and for worst-case phase alignment to the MUX3 data when coming on channel, a minimum of 16 mSec. is required to evaluate each channel for link request activity. With this timing, a base can scan 40 channels in 640 mSec. (i.e., 40×16) which will allow it to detect a 750 msec. link request on any of the channels. However, with existing timing, if the base were required to scan 60 channels, incoming (handset-to-base) link requests would go undetected. Thus, a method for allocating channels that advantageously utilizes the extended spectrum and that is compatible with existing timing is needed.

Moreover, even when the additional bands are allocated to CT2, many handsets will lack the capability to operate on the additional (extended) bands. Therefore, backward compatibility is desirable.

SUMMARY OF THE INVENTION

Briefly, according to the invention, a base station scans each channel in a first band at a first rate, and each channel in a second band at a second rate, to measure a received signal strength (RSS, or a received signal strength indication, RSSI) level for each channel scanned. The second rate is substantially higher than the first. The base station stores the measured RSS levels. If the base station detects a link request from a calling radio telephone on the first band, the base station determines whether channel reassignment is optimum, based on a comparison of the stored RSS information relating the first band and the stored RSS information relating to the second band. If the above determination is affirmative, the base station reassigns a second clear channel within a second band, to the calling radio telephone.

DETAILED DESCRIPTION OF THE PREFERRED EMBODIMENT

Figure 1:
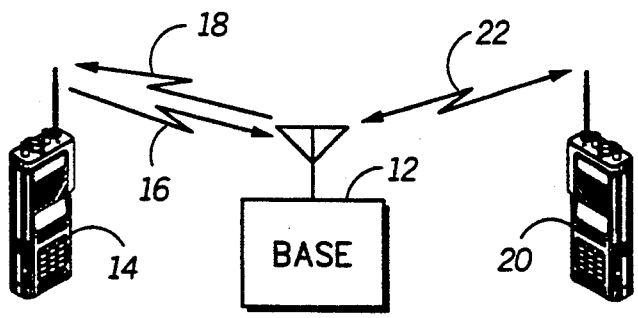
FIG. 1 is a block diagram of a communication system in accordance with the invention.

Referring to FIG. 1, there is shown a block diagram a CT2 communication system 10 in which the invention may be practiced. A base station 12 (also known as a telepoint) serves as a communication link for handsets (represented by handsets 14 and 20) in the communication system 10. When the handset 14 goes off hook, it transmits a link request signal 16 to the base 12 on a first channel.

Figure 2:
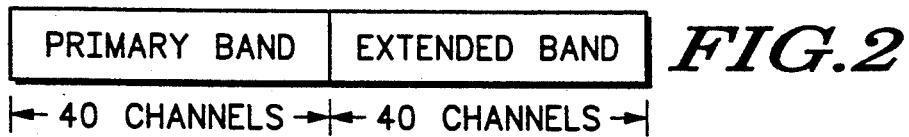
FIG. 2 shows an extended frequency spectrum comprising a primary band and a secondary band.

In accordance with the invention, the base 12 scans each channel in a primary band (shown in FIGS. 2 and 3) to measure the RSS level for each channel. Such a scan can be faster than the presently-used scan for channel markers because less time/channel is required to check for an RSS level than is required for checking a channel marker pattern. The base 12 keeps a record of RSS data for the scanned channels. In this embodiment, the primary band comprises the present 40 CT2 channels.

Figure 3:
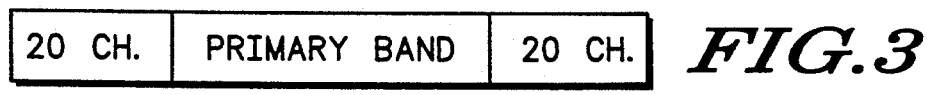
FIG. 3 shows another extended frequency spectrum comprising a primary band and a two additional bands.

As discussed above, a possible solution to the congestion problem in the primary band is to provide an additional (extended) 40-channel band adjacent to the primary band (see FIG. 2) or two 20-channel bands, one on each side of the primary band (see FIG. 3). Therefore, in accordance with the invention, when a base 12 detects a link request from a handset (e.g., handset 14 or handset 20), the base 12 determines (1) whether enabling voice communication on the selected channel is optimum, based on a comparison of the stored RSS data relating to the primary band and the stored RSS data relating to the secondary band, and (2) whether the calling handset has extended bandwidth capability. All handsets having extended bandwidth capability could be programmed to include an indication of such capability. If the base 12 determines (1) that assignment of the selected channel is not optimum, and (2) that the calling handset has extended bandwidth capability, the base 12 transmits a signal instructing the handset to select an available channel in the secondary band. Assignment of the selected channel in the first band is optimum if, based on the stored RSS data, the primary band is not above a predetermined level of congestion (or activity). If the selected channel is determined to be optimum, voice communication on the selected channel is enabled. Reassignment is considered to be optimum if, based on the stored RSS data, the secondary band is below a predetermined level of congestion and the calling radio telephone is capable of operating in the extended channel. Reassignment may also be considered to be optimum if, based on the stored RSS data, the primary band is above a predetermined level of congestion and the calling radio telephone is capable of operating in the extended channel. Another possible approach would be to reassign channels to distribute the RF traffic evenly between the primary and the secondary bands. Thus, the invention provides incoming handset call detection in the existing CT2 band with extended-band channel use assessment by a single receiver without need for additional hardware, and, consequently, the primary band is maintained as free from congestion as possible.

The timing of the channel-reallocation method is governed by the CAI requirement based on 5 separate RSS samples distributed over a time period between 200 msec and 2 sec. RSS data older than 2 sec. must not be used for channel assessment, and must be discarded. Thus, a method in accordance this invention may comprise the following timing:

| RSS Sample Window | 1.0 msec. |
|---|---|
| Synthesizer Program | 0.2 msec. |
| Synthesizer Lock | 0.8 msec. |
| Time/Channel | 2.0 msec. |
| Time/Channel | 2.0 msec. |
| × No. of Channels | × 40 |
| Sequential Scan | 80 msec. |
| Sequential Scan | 80 msec. |
| 40 Channel lock | + 10 msec. |
| Total Scan Time | 90 msec. |

As a part of the invention, the existing (primary) band channel assessment timing is accelerated by modifying the algorithm to examine RSS while waiting for channel marker detection. In advanced CT2 telepoint systems, if link request is detected, the RSS is examined to determine if enough margin to threshold is present to guarantee a good quality link to the subscriber. Using an accelerated scan method, the Channel is monitored only long enough to determine if the signal is above the threshold required for link establishment. If the signal is above the threshold, the channel will be monitored the full 16 mSec. for a Channel marker. With the MUX3 protocol (10 mSec. Tx, 4 mSec. Rx), the minimum time to sample RSS is 6 mSec. in order to insure a portion of a Tx frame was captured. During the accelerated scan, the RSS data for each channel is stored to later decide, based on comparison with RSS in the extended band, whether Channel reassignment is optimum.

The following is the incoming call detection timing for the existing CT2 band.

| RSS Sample Window | 6.0 msec. |
|---|---|
| Synthesizer Program | 0.2 msec. |
| Synthesizer Lock | 0.8 msec. |
| Time/Channel | 7.0 msec. |
| Time/Channel | 7.0 msec. |
| × No. of Channels | × 40 |
| Sequential Scan | 280 msec. |
| Sequential Scan | 280 msec. |
| 40 Channel lock | + 10 msec. |
| Total Scan Time | 290 msec. |

In accordance with another aspect of the invention, interleaved call detection (CD) and extended (or secondary) band (EB) call assessment use the following timing:

The call detection (CD) is made in the primary (or existing) band.

The interleaved assessment begins with three distributed RSS samples of the extended band followed by a scan (plus RSS record) of the existing band. Then two distributed RSS samples of the extended band are recorded and followed by a scan (plus RSS record) of the existing band. This cycle repeats until a link request is detected. If a link request is detected in the existing band, the oldest of the last five distributed RSS samples would be 1.03 sec. old (assuming detection on the last channel). This allows 970 msec. to use the RSS data for channel reassignment. This time is required for terminal capacity data exchanges (defined in the CAI) and for system loading margin. After link request is detected and the terminal capacity exchange indicates extended band channel reassignment is possible, the base determines if reassignment is optimum, based on the stored system loading information contained in the RSS tables of the existing band and extended band.

Figure 6:
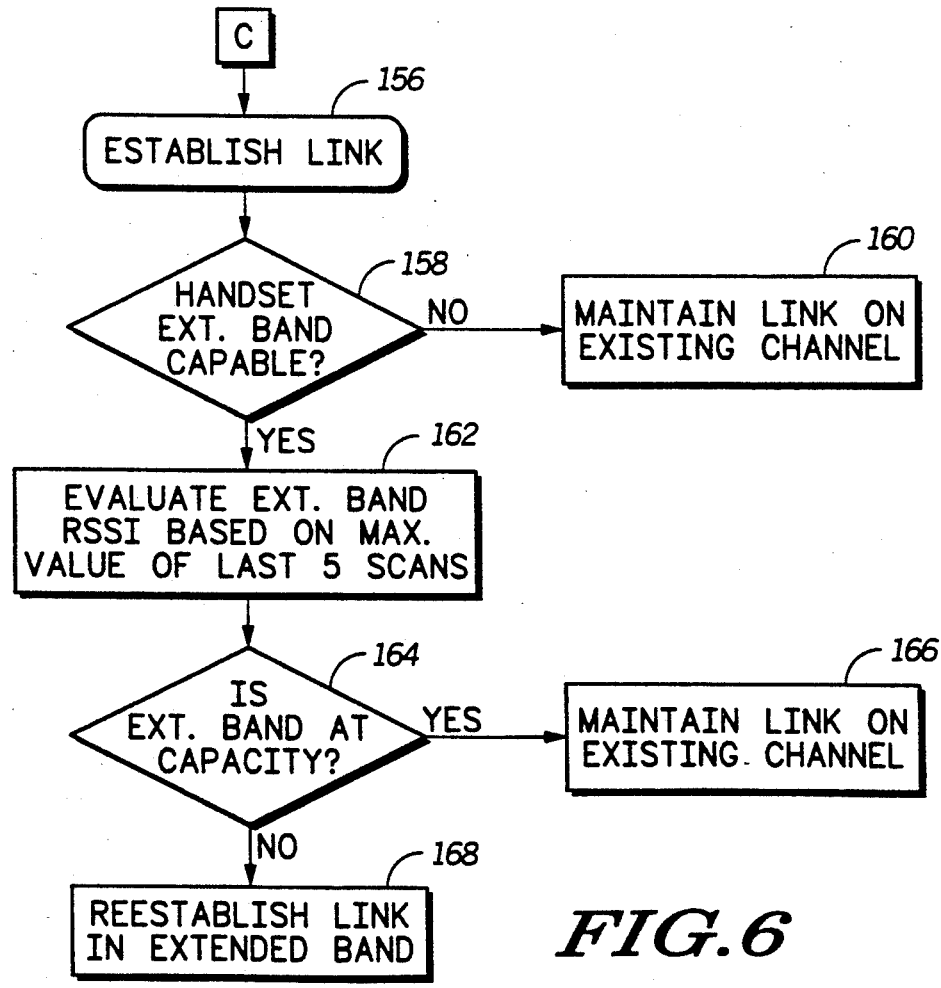
FIGS. 4–6 show a flow diagram of a method in accordance with the invention.
Figure 4:
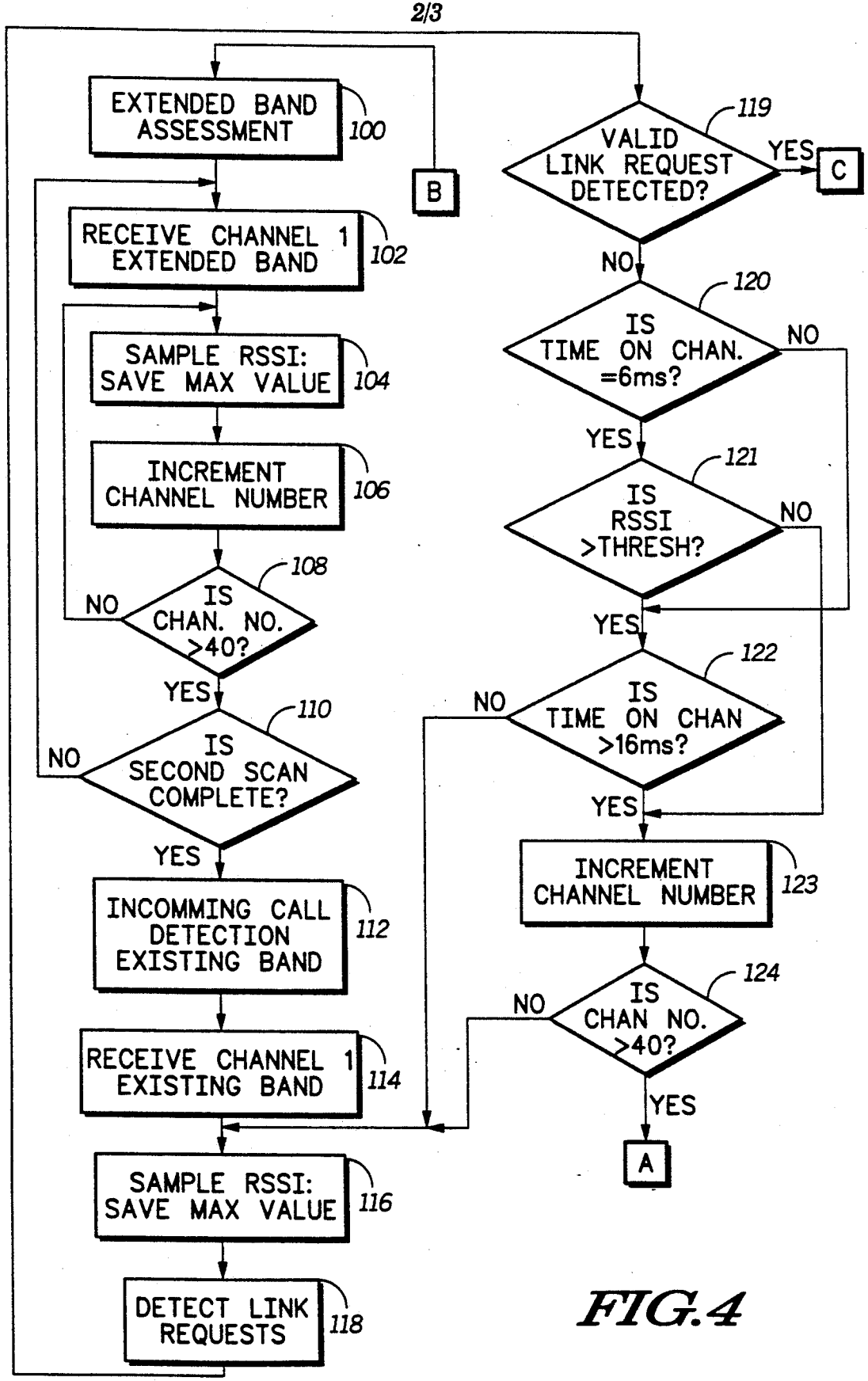
Figure 5:
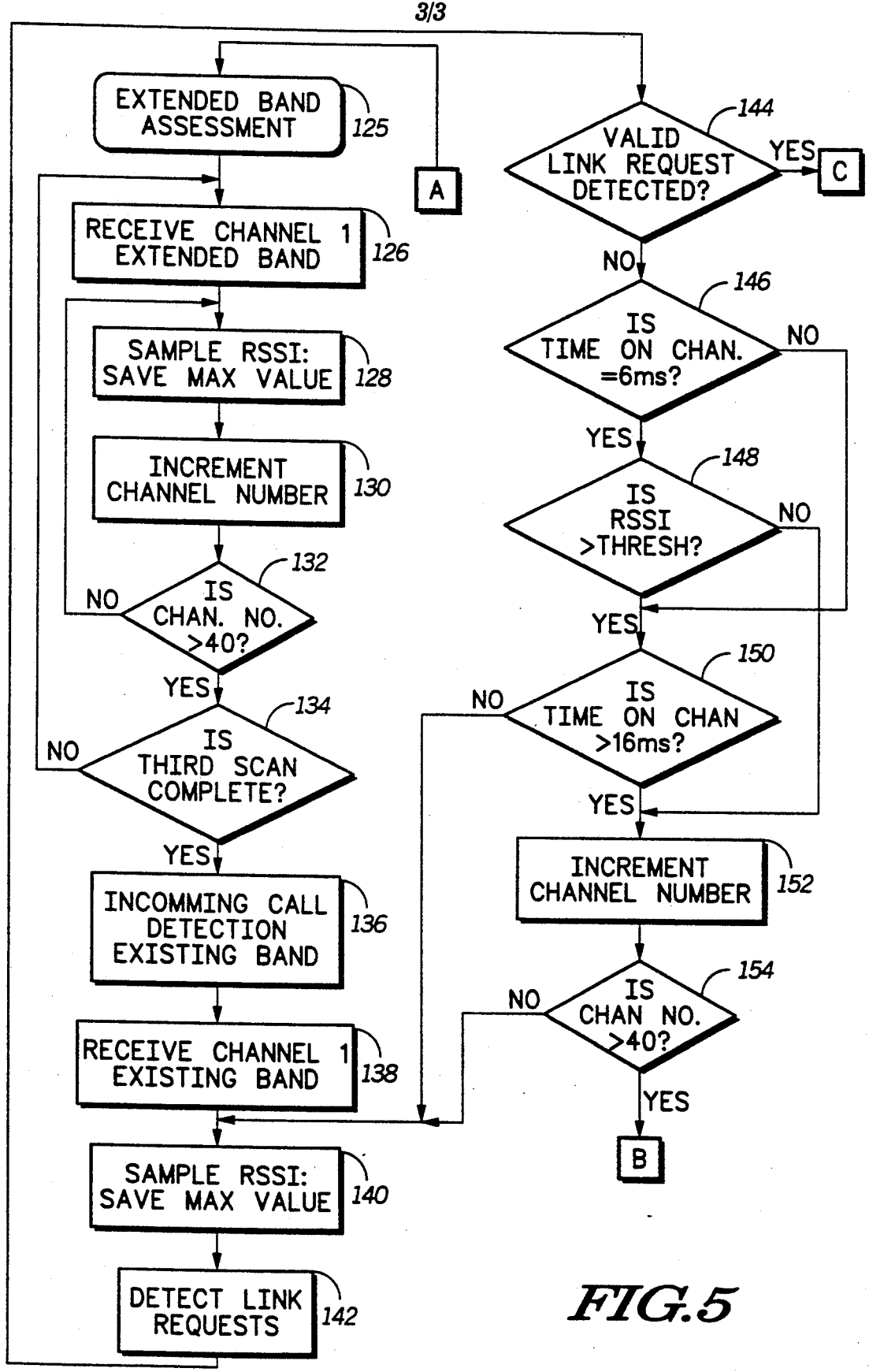

Referring to FIGS. 4-6, there is shown a flow diagram of a method for allocating a communication resource (a channel, in this example) in a CT2 communication system in accordance with the invention.

Referring to FIG. 4 there is shown a method for allocating radio channels to radio telephone units in accordance with the invention. In step 102 the base station receives on channel 1 of the extended band. In step 104 the base station samples an RSS level for the channel of which the signal was received. The maximum value of RSS sampled is then stored. In step 106 the channel number is incremented. A decision 108 is then made to determine whether the present channel is less than channel 40. If decision 108 is affirmative, a further decision 110 is made to determine whether the 2nd scan is completed. If the decision in step or decision 108 was negative, the process returns to step 104.

If the decision 110 is affirmative, then the process continues to step 112 wherein an incoming call detection on the existing band routine is begun. In step 114 the base station goes into a received mode on channel 1 of the existing or primary band. In step 116 the base station samples an RSS level for the present channel and saves the maximum sampled value. In step 118 the base station detects a link request. In decision 119 the base station determines whether a valid link request was detected. If decision 119 is affirmative, the process goes on to block C. If decision 119 is negative, a further decision 120 is made to determine whether the time on the channel is equal to 6 mSec. If decision 120 is affirmative a still further decision 121 is made to determine whether the RSS level measured is below a predetermined threshold. If decision 120 was negative, then the process continues to decision 122. If decision 121 was negative the process continues to step 123.

In decision 122 there is a determination made as to whether the time on the present channel is less than 16 mSec. If decision 122 is affirmative, the process continues to step 123. In step 123 the channel number is incremented. The process then continues to step or decision 122. In decision 124 there is a determination made as to whether the channel number is less than 40. If either

| ASSESSMENT: | EB | EB | EB | CD | EB | EB | CD | EB | EB | EB |
|---|---|---|---|---|---|---|---|---|---|---|
| TIME (mSec.): | 90 | 90 | 90 | 290 | 90 | 90 | 290 | 90 | 90 | 90 | decision 122 or decision 124 is negative, the process returns to step 116.

Referring now to FIG. 5, in step 125 an extended band assessment routine begins. In step 126 the base station receives on channel 1 of the extended band (secondary band). In step 128 the base station samples an RSS level for the present channel and saves the maximum value sampled. In step 138 the channel number is incremented. A decision 132 is then made to determine whether the channel number is less than channel 40. If decision 132 is affirmative, the process continues to decision 134, where determination of whether a third scan has been completed is made. If decision 132 is negative, the process continues to step 128. If decision 132 is affirmative, then a further decision 134 is made to determine whether the 3rd scan is complete. If decision 134 is affirmative, the process continues at step 136. If decision 134 is negative, the process continues at step 126.

In step 136, a routine begins for detecting incoming calls in the existing band. In step 138 the base station is on a mode wherein it receives on channel 1 of the existing band. In step 140, the base station samples an RSS level for the present band and saves the maximum sampled value. In step 142 an incoming link request signal is detected by the base station. In decision 144, a determination is made as to whether a valid link request signal was detected. If decision 144 is affirmative, the process continues to block C. If decision 144 is negative, a further decision 146 is made to determine whether the time spent on the channel scan is equal to 6 mSec.

If decision 146 is affirmative, a further decision 148 is made to determine whether the measured RSS level is above a predetermined threshold. If the decision 148 is affirmative a further decision 150 is made to determine whether the time on the present channel is above or greater than 16 mSec. If decision 148 is negative, the process continues to step 152. If decision 150 is affirmative the process proceeds to step 152 also. If decision 150 is negative, the process returns to step 140.

In step 152 the present channel number is incremented. The process is then continues to decision 154. In decision 154 a determination is made as to whether the present channel is number is greater than. 40. If decision 154 is affirmative, the process continues to block B. If decision 154 is negative, the process returns to step 140.

Referring now to FIG. 6, in step 156 a link is established. In decision 158 a determination is made as to whether the handset is capable of communicating on the extended band. If decision 158 is negative, the communication link is maintained on the existing channel in step 160. If decision 158 was affirmative, then in step 162, an evaluation of the existing band RSS based on maximum value of the last five scans is made.

In decision 164, a determination is made as to whether the existing band is at capacity. If decision 164 is affirmative, then the communication link is maintained on the existing channel in step 166. If decision 164 is negative, then the base station sends a link reestablish command to the calling radio telephone to rerequest a communication link in a channel in the extended band in step 168.

Therefore, the communication resource allocation process of the invention allocates channels in a secondary (or extended) band to calling radio telephone handsets that are capable of operating on the secondary band if the RSS level of the channel in which the link request signal was sent is above a predetermined threshold and there is at least one channel in the secondary band that has an RSS level at or below the predetermined threshold. This relieves congestion problems in the primary band (in which all radio telephones can operate) in a manner that is backward compatible with present radio telephone handsets.

What is claimed is:

1. A method for allocating radio channels to radio telephone units in a radio telephone communication system, comprising the steps of
    scanning a first band at a first rate, to measure the RSS levels for a plurality of channels within the first band;
    scanning a second band at a second rate, to measure RSS levels for a plurality of channels within the second band, the second rate being substantially greater than the first rate;
    storing the measured RSS levels;
    receiving a link request from a calling radio telephone unit on a first channel, the first channel being within the first band;
    comparing the RSS levels for the plurality of channels within the first band with the RSS levels for the plurality of channels within the second band to determine whether assignment of the requested channel is optimum;
    determining whether the calling radio telephone is capable of operating in the second band;
    assigning the first channel to the calling radio telephone unit if assignment of the requested channel is optimum; and
    re-assigning a second channel, that is within the second band, to the calling radio telephone unit, if assignment of the requested channel is not optimum and the calling radio telephone is capable of operating in the second band.

2. The method of claim 1, wherein the first band comprises forty channels that are scanned during a 290 millisecond period for each scanning cycle.

3. The method of claim 1, wherein the first and second bands each comprise forty channels and wherein the method is performed in scanning cycles comprising:
    scanning the first band for a first 290 millisecond interval;
    scanning the second band for three consecutive 90 millisecond intervals;
    scanning the first band for a second 290 millisecond interval;
    scanning the second band for two consecutive 90 millisecond intervals.

4. In a radio telephone communication system having at least one base station and a plurality of radio telephone units sharing a plurality of channels organized into a first band and a second band, a method for allocating a radio channel to a calling radio telephone unit, comprising the base station steps of:
    (a) scanning each channel in the first band to determine a received signal strength indication (RSSI) level for each channel in the first band, each channel being scanned for the minimum time required to determine whether the RSS level in the channel being scanned is above a predetermined threshold level, and if it is determined that the the RSS level in the channel being scanned is above a predetermined threshold level, that channel being monitored for the minimum period of time required to determine whether a channel marker is received;

(b) scanning each of the channels in the second band to determine whether there is at least one channel having an RSS level that is not above the predetermined threshold;

(c) storing the RSS levels determined in steps (a) and (b);

(d) receiving a communication link request, on a first channel within the first band, from a calling radio telephone unit;

(e) determining whether the RSS level for the first channel is above the predetermined threshold;

(f) determining whether the calling radio telephone unit is capable of operating on the second band; and (g) determining whether there is at least one channel in the second band having an RSS level that is not above the predetermined threshold; and (f) transmitting a channel reallocation signal to the calling radio telephone unit, when it is determined that the RSS level for the first channel is above the predetermined threshold, that the calling radio telephone unit is capable of operating on the second band, and that there is a channel in the second band having an RSS level that is not above the predetermined threshold, the channel reallocation signal instructing the calling radio telephone unit to transmit a link request signal on the channel in the second band determined in step (d) to have an RSS level that is not above the predetermined threshold.

* * * * *